US008689280B2

(12) United States Patent
Spektor et al.

(10) Patent No.: US 8,689,280 B2
(45) Date of Patent: Apr. 1, 2014

(54) DNS-BASED CONTENT ROUTING

(75) Inventors: Daron Spektor, Seattle, WA (US);
Bradley A. Cleaver, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 133 days.

(21) Appl. No.: 13/229,601

(22) Filed: Sep. 9, 2011

(65) Prior Publication Data

US 2013/0067530 A1 Mar. 14, 2013

(51) Int. Cl.
*H04L 29/06* (2006.01)
*G06F 15/173* (2006.01)
(52) U.S. Cl.
USPC ............... 726/1; 709/238; 709/239; 709/242; 709/243; 709/244
(58) Field of Classification Search
USPC .................. 726/1; 709/238–239, 242–244
See application file for complete search history.

(56) References Cited

U.S. PATENT DOCUMENTS

| 6,785,704 | B1 | 8/2004 | McCanne | |
|---|---|---|---|---|
| 7,289,519 | B1 | 10/2007 | Liskov | |
| 7,308,475 | B1 * | 12/2007 | Pruitt et al. | 709/203 |
| 7,921,226 | B2 | 4/2011 | Mukherjee et al. | |
| 2002/0188606 | A1 * | 12/2002 | Sun et al. | 707/10 |
| 2003/0028896 | A1 * | 2/2003 | Swart et al. | 725/127 |
| 2003/0115283 | A1 | 6/2003 | Barbir et al. | |
| 2003/0195984 | A1 * | 10/2003 | Zisapel et al. | 709/238 |
| 2006/0287936 | A1 * | 12/2006 | Jacobson | 705/35 |
| 2008/0235400 | A1 | 9/2008 | Slocombe et al. | |
| 2012/0303808 | A1 * | 11/2012 | Xie | 709/225 |

OTHER PUBLICATIONS

Pathan, et al., "A Taxonomy and Survey of Content Delivery Networks", Retrieved at <<http://www.cloudbus.org/cdn/reports/CDN-Taxonomy.pdf>>, Technical Report, GRIDS-TR-2007-4, Grid Computing and Distributed Systems Laboratory, Feb. 12, 2007, pp. 44.
Bhardwaj, et al., "Simulation and Comparison of Hashing Techniques in CDN DNS", Retrieved at <<http://www.ijest.info/docs/IJEST11-03-04-132.pdf>>, International Journal of Engineering Science and Technology, vol. 3, No. 4, Apr. 4, 2011, pp. 3039-3044.
Huang, et al., "Measuring and Evaluating Large-Scale CDNs", Retrieved at <<http://www.cs.brown.edu/courses/csci2950-u/papers/CDN-measuring-IMC08-huang.pdf>>, Internet Measurement Conference, Oct. 20-22, 2008, pp. 14.

* cited by examiner

*Primary Examiner* — Beemnet Dada
*Assistant Examiner* — Kalish Bell
(74) *Attorney, Agent, or Firm* — Bryan Webster; Andrew Sanders; Micky Minhas

(57) ABSTRACT

DNS-based content routing techniques are described. In one or more implementations, data is examined that describes interactions via a network with content via a domain name. Responsive to the examination, a policy is adjusted to change how one or more network addresses are resolved for the domain name for access to the content. A communication is formed that includes the adjusted policy to be communicated to one or more domain name system (DNS) servers, the adjusted policy configured to specify which network address are resolved for the domain name by the one or more DNS servers for access to the content.

20 Claims, 4 Drawing Sheets

DNS-BASED CONTENT ROUTING

BACKGROUND

Through the Internet, users may access content from across the globe. However, efficiency in accessing the content may decrease the farther the content is located away from the user. Accordingly, techniques were developed to distribute content via caches that may be located closer to users that desire access to the content. However, these traditional techniques could suffer from inefficiencies due to storage of content in the caches that is utilized by few other users, such as personal data.

SUMMARY

DNS-based content routing techniques are described. In one or more implementations, data is examined that describes interactions via a network with content via a domain name. Responsive to the examination, a policy is adjusted to change how one or more network addresses are resolved for the domain name for access to the content. A communication is formed that includes the adjusted policy to be communicated to one or more domain name system (DNS) servers, the adjusted policy configured to specify which network addresses are resolved for the domain name by the one or more DNS servers for access to the content.

In one or more implementations, a domain name is received for resolution at one or more domain name system (DNS) servers. The domain name is parsed, by the one or more DNS servers, to locate a sub-domain to identify content to be obtained via the domain name and a determination is made as to how to resolve the domain name, by the one or more DNS servers, based on a policy that corresponds to the identification of the content. The domain name is resolved by the one or more DNS servers based on the policy.

In one or more implementations, one or more computer-readable storage media comprise computer-executable instructions that, responsive to execution by a computing device, causes the computing device to locate a policy based on a sub-domain included in a domain name that uniquely identifies content and resolve the domain name to a network address based on the policy.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Performance of internet services may be improved by locating data closer to a user. This may be done through use of a content-distribution network (CDN), which may be configured to provide caches located at different geographic locations. For example, servers of a CDN may retrieve target data from a source and then cache it locally for future retrieval. Consequently, each CDN cluster may eventually accumulates a copy of each piece of popular data. Although this works well with relatively small amounts of widely-distributed data, this technique may be inefficient when confronted with large amounts of seldom-accessed data.

Techniques are described in which DNS routing may be adjusted to improve efficiency of content access and distribution. For example, a service analyst may be configured to examine data to determine how content is requested, e.g., from which geographic locations, a number of times requested, whether the requests may be part of a malicious attack, and so on. The service analyst may then configure a policy that describes how the subsequent requests for the content are to be routed. For example, a policy may be configured such that callers may be routed to specific locations, a policy may be configured to cease resolution or resolve to a non-routable address for disabled content, a policy may be configured to route callers to clusters in which the content has been demanded the most, a policy may be adjusted to route to more or fewer server clusters in order to control how caches are used, and so on. Unique or pseudo-unique domain names may also be assigned to content for the purpose of assigning and dynamically changing DNS resolution policies at a content level. A variety of other examples are also contemplated, further discussion of which may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
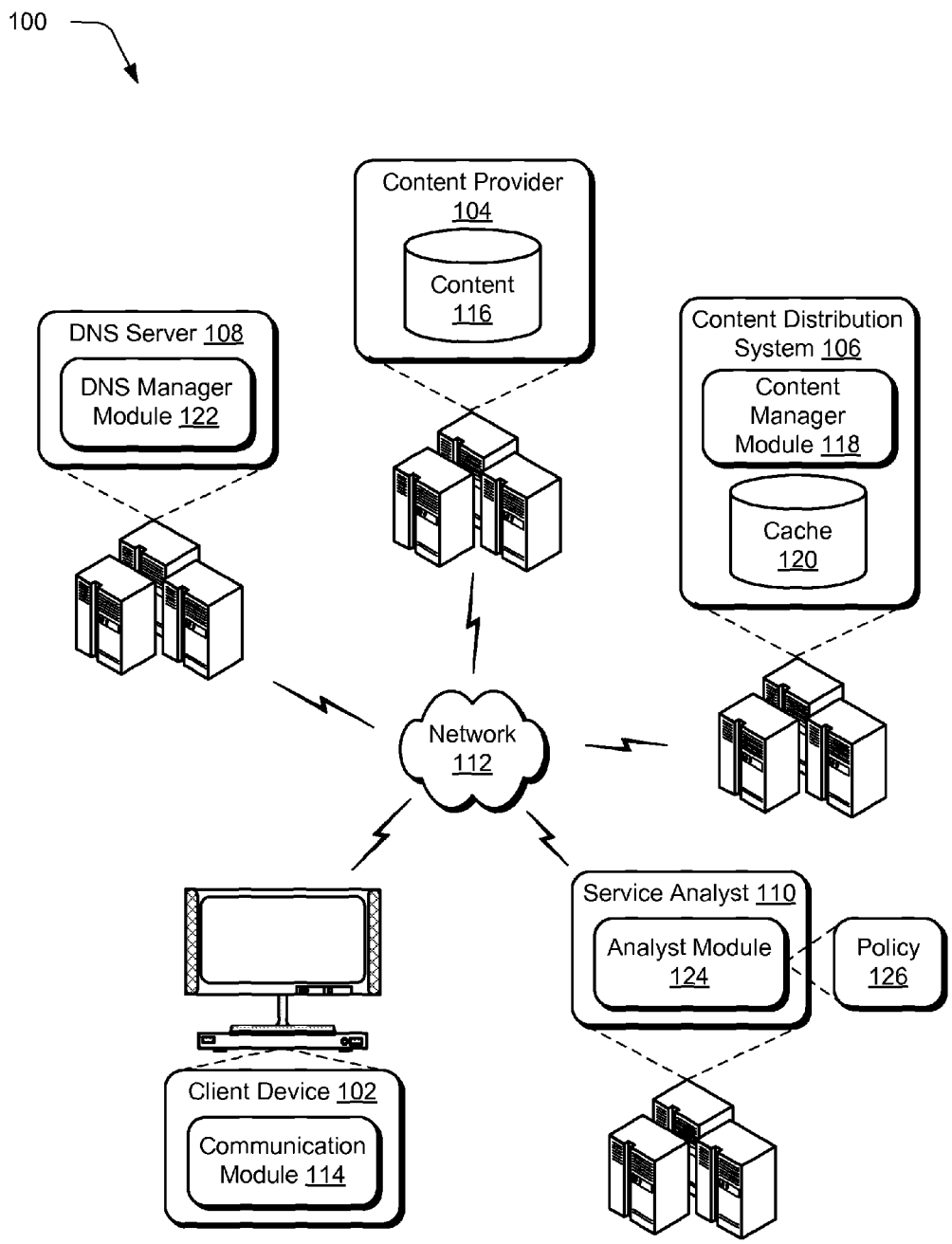
FIG. 1 is an illustration of an environment in an example implementation that is operable to perform DNS-based content routing.

FIG. 1 is an illustration of an environment 100 in an example implementation that is operable to employ techniques described herein. The illustrated environment 100 includes a client device 102, a content provider 104, a content distribution system 106, a domain name service (DNS) server 108, and a service analyst 110 that are communicatively coupled via a network 112. Although illustrated separately, these entities may be further combined and/or separated, e.g., the DNS server 108 may incorporate functionality of the service analyst 110. The service analyst 110 may be part of the content provider 104 and/or content distribution system 106, and so on. The client device 102, content provider 104, content distribution system 106, domain name service (DNS) server 108, and service analyst 110 are each illustrated as being implemented using one or more computing devices, which may be configured in a variety of ways.

For example, a computing device may be configured as a computer that is capable of communicating over the network 112, such as a desktop computer, a mobile station, an entertainment appliance, a set-top box communicatively coupled to a display device, a wireless phone, a game console, and so forth. The client device 102 is illustrated as being implemented as a personal computer. The content provider 104, content distribution system 106, domain name service (DNS) server 108, and service analyst 110 are illustrated as being implemented using a plurality of servers, e.g., a server farm, although other implementations are also contemplated.

Thus, computing devices may range from full resource devices with substantial memory and processor resources (e.g., personal computers, game consoles) to a low-resource device with limited memory and/or processing resources (e.g., traditional set-top boxes, hand-held game consoles). Additionally, although a single computing device is shown for the client device 102 and multiple servers are illustrated for the content provider 104, content distribution system 106, domain name service (DNS) server 108, and service analyst 110 it should be readily apparent that different numbers of devices may be utilized to implement the represented functionality.

Although the network 112 is illustrated as the Internet, the network may assume a wide variety of configurations. For example, the network 112 may include a wide area network (WAN), a local area network (LAN), a wireless network, a public telephone network, an intranet, and so on. Further, although a single network 112 is shown, the network 112 may be configured to include multiple networks.

The client device 102 is further illustrated as including a communication module 114. The communication module 114 is representative of functionality of the client device 102 to interact with the network 112, such as to access content 116 from the content provider 104. The communication module 114, for instance, may be implemented as a browser, part of network functionality of an application or operating system of the client device 102, and so on. Thus, the communication module 114 may interact with the content 116 via the network 112 in a variety of ways, such as to download the content 116, interact with the content "in the cloud," and so on. The content 116 may also take a variety of forms, such as data, downloadable files, media files, music files, productivity files (e.g., documents, spreadsheets, presentations, drawings), images, videos, and so on.

As previously described, access to the content 116 may be improved by locating the content 116 closer to a client device 102 that is utilized to request the content 116. One technique that may be employed for such locating is a content distribution system 106.

The content distribution system 106 of FIG. 1 is illustrated as including a content manager module 118 and a cache 120. The content manager module 118 is representative of functionality of the content distribution system 106 to locate content 116 for storage in a cache 120. For example, the content distribution system 106 may involve a plurality of clusters of computing devices (e.g., servers) that are physically located at different geographic locations.

When a request is made at the content distribution system 106 for content, the content manager module 118 may first determine whether the content is available locally via a cache 120. If the content is not available, the content manager module 118 may retrieve the content from its source, e.g., the content 116 from the content provider 104. The retrieved content 116 may then be stored in the cache 120 such that the content 116 is available for a subsequent request for the content 116. As previously described these techniques work well for storing relatively small amounts of widely-distributed data, but may become inefficient when confronted with seldom-accessed data.

In the example environment 100 described in FIG. 1, however, DNS-based content routing may be employed to improve efficiency of access and distribution of content 116. For example, the DNS server 108 is illustrated as including a DNS manager module 122. The DNS manager module 122 is representative of functionality to resolve a domain name to a network address, e.g., "www.example.com" to "192.0.32.10" for IPv4 or "2620:0:2d0:200::10" for IPv6. In the illustrated environment 100, this resolution may be leveraged to control access and distribution of the content 116.

The environment 100 is further illustrated as including a service analyst 110 having an analyst module 124. The analyst module 124 is representative of functionality to examine data that describes requests for access to the content 116 made by one or more client devices 102. Based on this examination, the analyst module 124 may form a policy 126 that describes how the DNS manager module 122 of the DNS server 108 is to resolve domain names for the content 116. In this way, the routing may be performed before involving a content distribution system 106 or a content provider 104, itself. This routing may be performed to support a variety of different functionality.

For example, the policy 126 may be used to describe which cluster of a content distribution network receives a request for content. The policy 126, for instance, may specify particular network addresses for clusters based on popularity of the content, i.e., a number of requests to access the content. For instance, the service analyst 110 may initially configure the DNS servers 108 to resolve requests for the content 116 to a single cluster of the content distribution system 106.

If the content 116 increases in popularity, the service analyst 110 may instruct the DNS server 108 through a policy to begin resolution to a plurality of clusters of the content distribution system 106, resolve to a cluster that corresponds to a geographic location of the requestor, resolve to a third-party content distribution system, and so on. Thus, in this example the policy 126 may cause the DNS server 108 to leverage the content distribution system 106 and control how the content distribution system 106 receives requests for content and consequently caches the content. Thus, this technique may be used to manage the content distribution system 106 without the content distribution system 106 even being "aware" that this management has occurred.

The policy 126 generated by the service analyst 110 may also leverage the DNS routing without involving the content distribution system 106. For example, the policy 126 may configure the DNS manager module 122 to cease resolution or resolve to a non-routable address for disabled content. In another example, the analyst module 124 may determine that requests for the content 116 have exceeded a policy limit, e.g., are indicative of an attack by a malicious party. Therefore, the analyst module 124 may configure the policy to cause the DNS manager module 122 to resolve the domain name to an unroutable address, e.g., a fake address, "local host," and so forth.

Thus, these techniques may also be leveraged to support changes to a DNS resolution policy to route callers to specific locations. In this way, DNS may be used instead of other mechanisms like HTTP redirects.

The environment 100 may also be configured to leverage unique or pseudo-unique domains names for the content 116 to assign and dynamically change DNS resolution policies at the content level. For example, the DNS servers 108 may be authoritative for DNS zone such as "storage.com." Content 116 may then be hosted on uniform resource locators (URLs) that include sub-domains (e.g., tokens) to form pseudo-unique domain names such as "http://token1.storage.com/content" or "http://token1.token2.storage.com/content." Thus, the DNS manager module 122 may make resolution decisions based on the tokens in the domain name.

For example, if one of the tokens identifies the content owner, the DNS manager module 122 may look up the user's data's location in a database and resolve the call to the servers that host the data. In another example, one or more tokens may be configured as unique strings intended to give different content different domains. The DNS manager module 122 may then consult a list of instructions for specific tokens and make resolution decisions accordingly. Thus, a domain name may be assigned that includes an identification in a path part of the URL to identify specific content. In this way, the routing decisions may be made that otherwise could not be made by the DNS servers, themselves.

For example, the DNS manager module 112 may include a "block list" for abusive domains. The analyst module 124, for instance, may employ one or more processes that analyze a service's log files (e.g., from a DNS server 108, content provider 104, content distribution system 106, and so on) for abusive or anomalous behavior, and also real-time processes that identify popular content as requests are received. If these processes indicate unacceptable access patterns, the policy 126 may be configured to add an entry to the block list utilized by the DNS manager module 122, thereby resulting in the DNS server 108 ceasing resolution of the domain. Further discussion of DNS-based content routing may be found in relation to the following procedures.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Example Procedures

The following discussion describes DNS-based content routing techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1.

Figure 2:
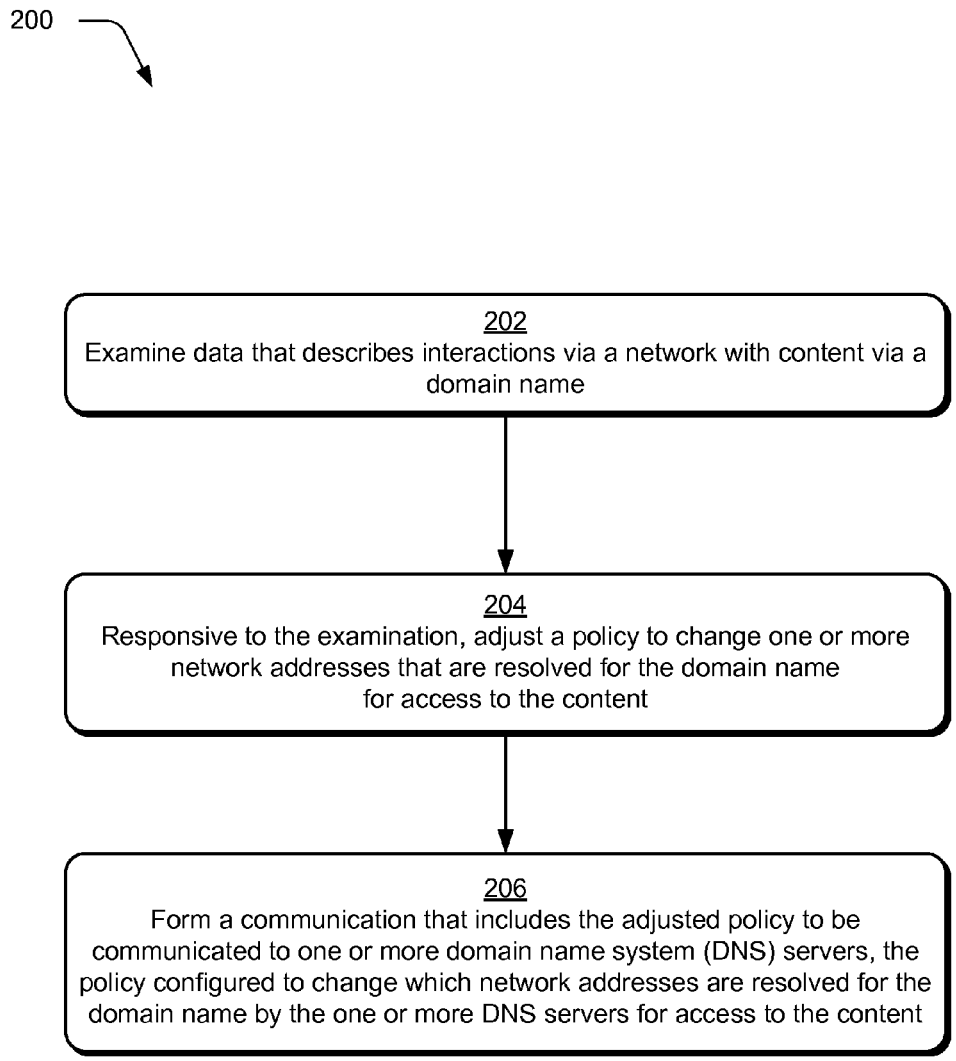
FIG. 2 is a flow diagram depicting a procedure in an example implementation in which a policy is adjusted and utilized to change which network addresses are resolved for a domain name by DNS servers.

FIG. 2 depicts a procedure 200 in an example implementation in which a policy is adjusted and utilized to change which network addresses are resolved for a domain name by DNS servers. Data is examined that describes interactions via a network with content via a domain name (block 202). The data, for instance, may originate from logs of the DNS server 108, content provider 104, and/or content distribution system 106 to describe requests made for content. The requests may be described in a number of ways, such as identifying an originator of the request, a number of requests, frequency of the requests, geographic location of a requestor, and so forth.

Responsive to the examination, a policy is adjusted to change one or more network addresses that are resolved for the domain name for access to the content (block 204). The policy 126, for instance, may be formed by an analyst module 124 of a service analyst 110.

The policy 126 may specify a variety of changes that may be made to route requests for content. Examples of this include a change from routing each request to the domain name to a single cluster of a content distribution network to a plurality of clusters of the content distribution network, changing routing to a particular one of a plurality of clusters of a content distribution network as a result of the examination of the data indicating that the particular said cluster experiences higher demand for the content than one or more other clusters of the content distribution network.

Additional examples include changing from routing each request to the domain name to a single cluster of a content distribution network to a particular one of a plurality of clusters of the content distribution network that are determined to be closer to an originator of the request, e.g., responsive to an indication that requests to access the content have increased. Further examples include changing the policy 126 to cease resolution or resolve to a non-routable address for disabled content or content that has exceeded a policy limit, e.g., indicative of an attack. A variety of other examples are also contemplated.

A communication is then formed that includes the adjusted policy to be communicated to one or more domain name system (DNS) servers, the policy configured to change which network addresses are resolved for the domain name by the one or more DNS servers for access to the content (block 206). The communication, for instance, may be communicated between an analyst module 124 and a DNS manager module 122, both being implemented on a same computing device, part of a same server farm, involve communication over the network 112, and so forth. Thus, the policy 126 may be used by the DNS server 108 to route request for content.

Figure 3:
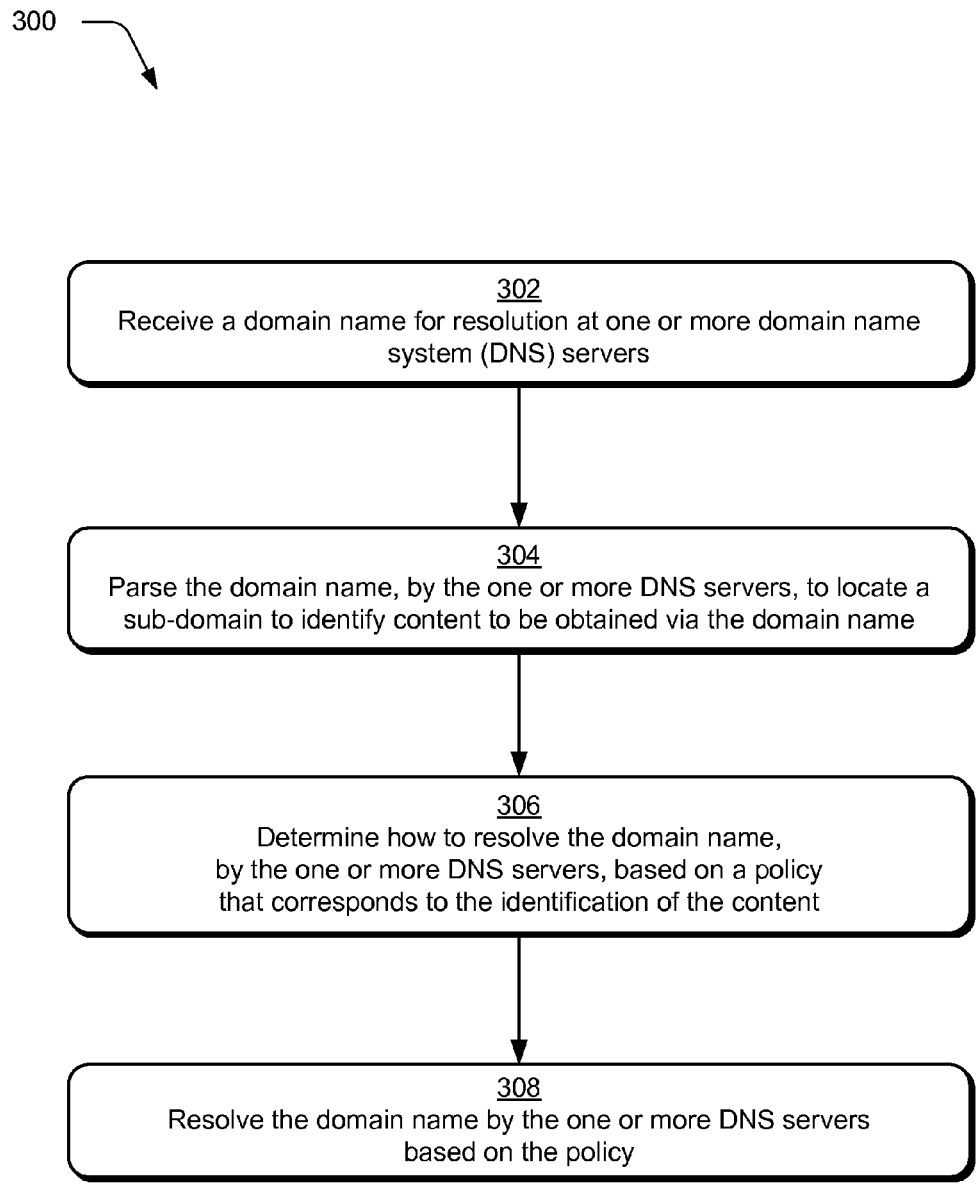
FIG. 3 is a flow diagram depicting a procedure in an example implementation in which a domain name is parsed to locate a sub-domain that identifies content to determine how to resolve the domain name according to a policy.

FIG. 3 depicts a procedure 300 in an example implementation in which a domain name is parsed to locate a sub-domain that identifies content to determine how to resolve the domain name according to a policy. A domain name is received for resolution at one or more domain name system (DNS) servers (block 302). A client device 102, for instance, may form a request for content 116 that includes a domain name of the content provider 104.

The domain name is parsed, by the one or more DNS servers, to locate a sub-domain to identify content to be obtained via the domain name (block 304). The sub-domain may be used by the DNS server 108 to obtain the request to resolve the request as well as to identify content 116 that corresponds to the request.

A determination is made as to how to resolve the domain name, by the one or more DNS servers, based on a policy that corresponds to the identification of the content (block 306). The domain name is then resolved by the one or more DNS servers based on the policy (block 308). The DNS manager module 122, for instance, may locate a policy 126 based on the identification of the content 116 using the sub-domain. The policy 126 may then describe how to resolve the domain name to a network address, examples of which were described above in relation to FIG. 2. In this way, the sub-domain may be used as a token by the DNS manager module 122 to identify content 116 and react accordingly and may do so without involving resources of the content provider 104 or content distribution system 106, i.e., may do so before routing to these devices as was involved in some traditional content distribution techniques.

Example Device

Figure 4:
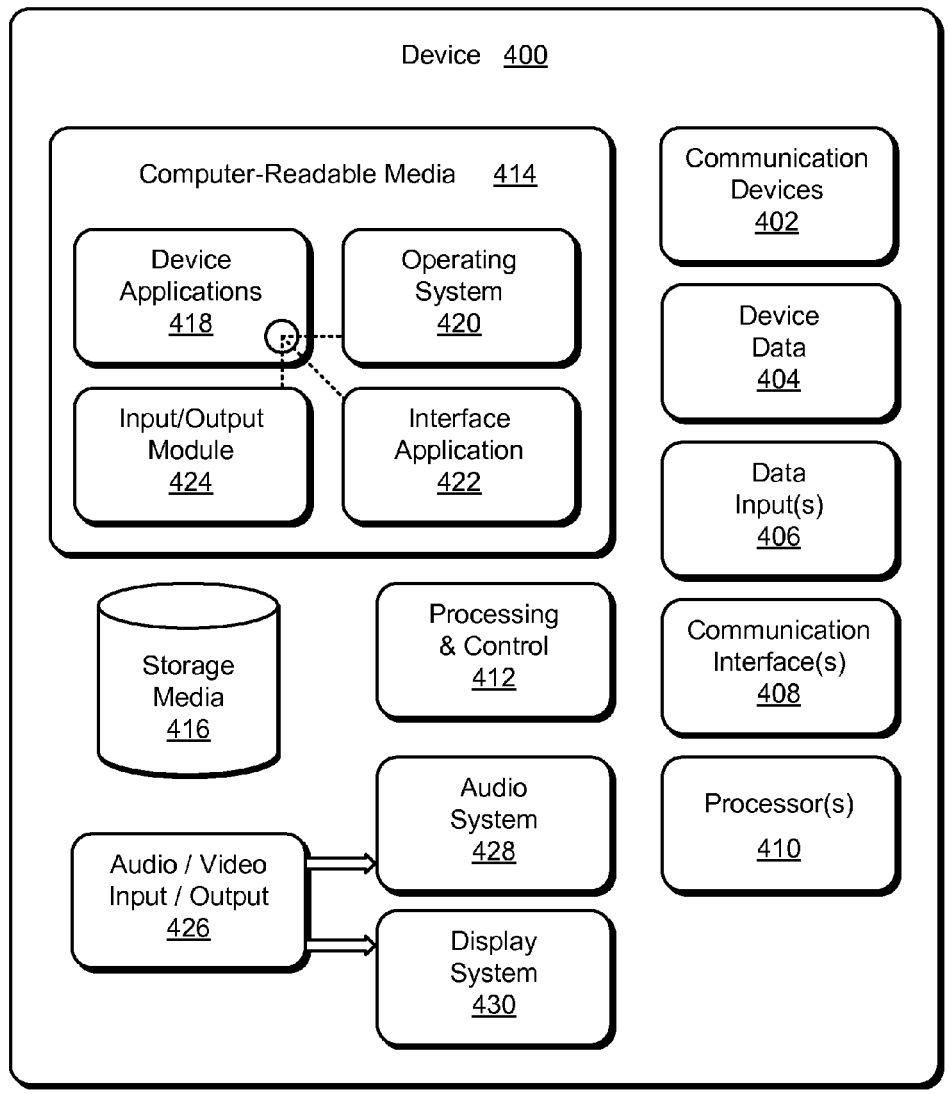
FIG. 4 illustrates various components of an example device that can be implemented as any type of computing device as described with reference to FIG. 1 to implement embodiments of the techniques described herein.

FIG. 4 illustrates various components of an example device 400 that can be implemented as any type of computing device as described with reference to FIG. 1 to implement embodiments of the techniques described herein. Device 400 includes communication devices 402 that enable wired and/or wireless communication of device data 404 (e.g., received data, data that is being received, data scheduled for broadcast, data packets of the data, etc.). The device data 404 or other device content can include configuration settings of the device, media content stored on the device, and/or information associated with a user of the device. Media content stored on device 400 can include any type of audio, video, and/or image data. Device 400 includes one or more data inputs 406 via which any type of data, media content, and/or inputs can be received, such as user-selectable inputs, messages, music, television media content, recorded video content, and any other type of audio, video, and/or image data received from any content and/or data source.

Device 400 also includes communication interfaces 408 that can be implemented as any one or more of a serial and/or parallel interface, a wireless interface, any type of network interface, a modem, and as any other type of communication interface. The communication interfaces 408 provide a connection and/or communication links between device 400 and a communication network by which other electronic, computing, and communication devices communicate data with device 400.

Device 400 includes one or more processors 410 (e.g., any of microprocessors, controllers, and the like) which process various computer-executable instructions to control the operation of device 400 and to implement embodiments of the techniques described herein. Alternatively or in addition, device 400 can be implemented with any one or combination of hardware, firmware, or fixed logic circuitry that is implemented in connection with processing and control circuits which are generally identified at 412. Although not shown, device 400 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 400 also includes computer-readable media 414, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 400 can also include a mass storage media device 416.

Computer-readable media 414 provides data storage mechanisms to store the device data 404, as well as various device applications 418 and any other types of information and/or data related to operational aspects of device 400. For example, an operating system 420 can be maintained as a computer application with the computer-readable media 414 and executed on processors 410. The device applications 418 can include a device manager (e.g., a control application, software application, signal processing and control module, code that is native to a particular device, a hardware abstraction layer for a particular device, etc.). The device applications 418 also include any system components or modules to implement embodiments of the techniques described herein. In this example, the device applications 418 include an interface application 422 and an input/output module 424 that are shown as software modules and/or computer applications. The input/output module 424 is representative of software that is used to provide an interface with a device configured to capture inputs, such as a touchscreen, track pad, camera, microphone, and so on. Alternatively or in addition, the interface application 422 and the input/output module 424 can be implemented as hardware, software, firmware, or any combination thereof Additionally, the input/output module 424 may be configured to support multiple input devices, such as separate devices to capture visual and audio inputs, respectively.

Device 400 also includes an audio and/or video input-output system 426 that provides audio data to an audio system 428 and/or provides video data to a display system 430. The audio system 428 and/or the display system 430 can include any devices that process, display, and/or otherwise render audio, video, and image data. Video signals and audio signals can be communicated from device 400 to an audio device and/or to a display device via an RF (radio frequency) link, S-video link, composite video link, component video link, DVI (digital video interface), analog audio connection, or other similar communication link. In an embodiment, the audio system 428 and/or the display system 430 are implemented as external components to device 400. Alternatively, the audio system 428 and/or the display system 430 are implemented as integrated components of example device 400.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices, the method comprising:
   examining, using a service analyst, data that describes interactions between a client device and one or more domain name system (DNS) servers via a network with content via a domain name;
   responsive to the examining, adjusting a policy to change one or more network addresses that are resolved by the one or more DNS servers for the domain name for access to the content, the adjusting based on the examining of the interactions between the client device and the one or more DNS servers, wherein the adjusted policy specifies which network address to resolve a request based on a token included in the request, wherein the token includes a user identifier of a content owner of content at the domain name;
   forming a communication that includes the adjusted policy to be communicated to one or more servers, the policy configured to change which network addresses are resolved for the domain name by the one or more DNS servers for access to the content from any device; and
   sending the communication that includes the adjusted policy to the one or more DNS servers.

2. A method as described in claim 1, wherein the examining identifies a part of the domain name that identifies the content and the adjusting specifies which network addresses are resolved for the content based on the identification.

3. A method as described in claim 1, wherein the adjusting changes which cluster of a content distribution network receives a request for content.

4. A method as described in claim 3, wherein clusters of the content distribution network have unique network addresses, respectively.

5. A method as described in claim 1, wherein:
   the adjusting changes from routing each request to the domain name to a single cluster of a content distribution network to routing each request to the domain name to a plurality of clusters of the content distribution network; or
   the adjusting changes from routing each request to the domain name to the plurality of clusters of the content distribution network to routing each request to the domain name to a single cluster of the content distribution network.

6. A method as described in claim 1, wherein the adjusting changes routing to a particular one or more of a plurality of clusters of a content distribution network as a result of the examination of data indicating that the one or more particular said clusters experience higher demand for the content than one or more other said clusters of the content distribution network.

7. A method as described in claim 1, wherein the adjusting changes routing to a particular one or more of a plurality of clusters of a content distribution network as a result of the examination of data indicating that the particular said one or more clusters are determined to be closer to an originator of the request.

8. A method as described in claim 7, wherein the adjusting performs the change responsive to an indication, formed as a result of the examining, that requests to access the content have increased.

9. A method as described in claim 1, wherein the adjusting changes the policy to cease resolution or resolve to a non-routable address for content that is no longer permitted to be accessed.

10. A method as described in claim 1, wherein:
    the examining indicates that requests for the content have exceeded a policy limit; and
    the adjusting changes the one or more network addresses that are resolved for the domain name to an unroutable address.

11. A method as described in claim 1, wherein the data is obtained from a log formed at the one or more domain name system (DNS) servers.

12. One or more computer-readable storage memories storing computer-readable instructions which, when executed, perform operations comprising:
    examining, using a service analyst, data that describes interactions between a client device and one or more domain name system (DNS) servers via a network with content via a domain name;
    responsive to the examining, adjusting a policy to change one or more network addresses that are resolved by the one or more DNS servers for the domain name for access to the content, the adjusting based on the examining of the interactions between the client device and the one or more DNS servers, wherein the adjusted policy specifies which network address to resolve a request based on a token included in the request, wherein the token includes a user identifier of a content owner of content at the domain name;
    forming a communication that includes the adjusted policy to be communicated to one or more servers, the policy configured to change which network addresses are resolved for the domain name by the one or more DNS servers for access to the content from any device; and
    sending the communication that includes the adjusted policy to the one or more DNS servers.

13. The one or more computer-readable storage memories of claim 12, wherein the examining identifies a part of the domain name that identifies the content and the adjusting specifies which network addresses are resolved for the content based on the identification.

14. The one or more computer-readable storage memories of claim 12, wherein the adjusting changes which cluster of a content distribution network receives a request for content.

15. The one or more computer-readable storage memories of claim 14, wherein clusters of the content distribution network have unique network addresses, respectively.

16. The one or more computer-readable storage memories of claim 12, wherein:
    the adjusting changes from routing each request to the domain name to a single cluster of a content distribution network to routing each request to the domain name to a plurality of clusters of the content distribution network; or
    the adjusting changes from routing each request to the domain name to the plurality of clusters of the content distribution network to routing each request to the domain name to a single cluster of the content distribution network.

17. The one or more computer-readable storage memories of claim 12, wherein the adjusting changes routing to a particular one or more of a plurality of clusters of a content distribution network as a result of the examination of data indicating that the one or more particular said clusters experience higher demand for the content than one or more other said clusters of the content distribution network.

18. The one or more computer-readable storage memories of claim 12, wherein the adjusting changes routing to a particular one or more of a plurality of clusters of a content distribution network as a result of the examination of data indicating that the particular said one or more clusters are determined to be closer to an originator of the request.

19. The one or more computer-readable storage memories of claim 18, wherein the adjusting performs the change responsive to an indication, formed as a result of the examining, that requests to access the content have increased.

20. The one or more computer-readable storage memories of claim 12, wherein the adjusting changes the policy to cease resolution or resolve to a non-routable address for content that is no longer permitted to be accessed.

* * * * *